Figure 1:
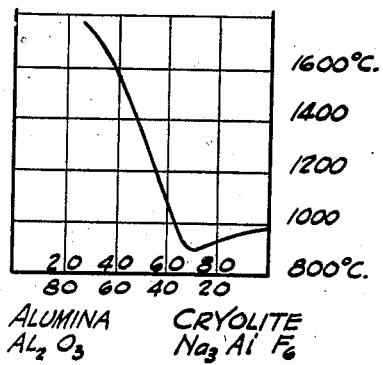
Figure 2:
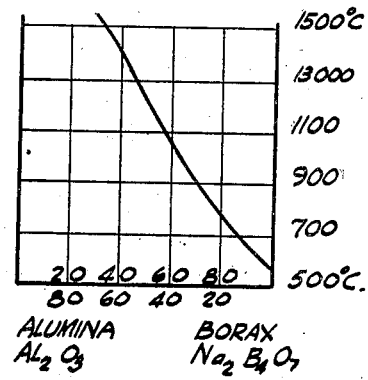
Figure 3:
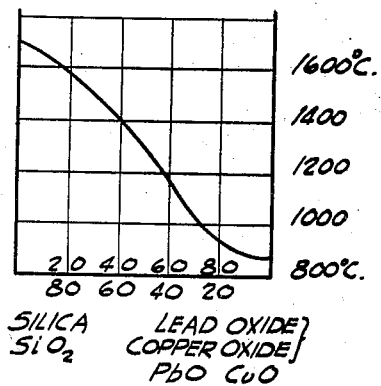

Oct. 2, 1934.  R. C. BENNER ET AL  1,975,069
GLAZED REFRACTORY ARTICLES AND METHOD OF MAKING THE SAME
Filed Nov. 12, 1928

CONE FUSION DIAGRAMS.

ALUMINA    CRYOLITE
$Al_2O_3$    $Na_3AlF_6$

ALUMINA    BORAX
$Al_2O_3$    $Na_2B_4O_7$

SILICA    LEAD OXIDE
$SiO_2$    COPPER OXIDE
         PbO  CuO

BARIUM          SODIUM
METASILICATE    SILICATE
$BaSiO_3$        $Na_2SiO_3$.

INVENTORS
Raymond C Benner
Henry N Baumann Jr.
by Bymes Stebbins & Parmelee
ATTORNEYS Patented Oct. 2, 1934

1,975,069

UNITED STATES PATENT OFFICE 1,975,069

GLAZED REFRACTORY ARTICLES AND METHOD OF MAKING THE SAME

Raymond C. Benner and Henry N. Baumann, Jr., Niagara Falls, N. Y., assignors to The Carborundum Company, Niagara Falls, N. Y., a corporation of Pennsylvania Application November 12, 1928, Serial No. 318,829

27 Claims. (Cl. 25—156)

Our invention relates in particular to a protective glaze for silicon carbide refractories, but it may be applied to other refractory products where the protection from oxidation of one or more of the refractory constituents is desirable. By the term "glaze" as just used, we mean "a coating of glass". We use the term "glass" to connote physical mixtures (usually of oxides of non-metals with oxides of metals) having no definite melting point but having a high softening point and displaying generally the characteristics of undercooled liquids. These glazes may be made by painting the article under treatment with a wet mix of the glaze materials in the cold state. The articles are then dried and after drying, heated until the glazing material has become sufficiently liquid to penetrate the surface of the article to be protected and has reached the temperature for which the glaze is designed. We are aware that a number of protective glazes are now used, but these glazes are generally highly refractory, requiring high temperatures to mature them, and therefore do not protect the refractory from oxidation during the most critical period of manufacture. Our experiments have repeatedly shown that the silicon carbide will begin to oxidize rapidly as low as 900° C., and the rate of oxidation increases rapidly with increasing temperatures above that point.

Many of our bonds for silicon carbide when properly fired protect the grain satisfactorily, but in a number of cases temperature as high as 1450° C. are required to vitrify the bonds, with the result that the silicon carbide in the refractory is largely oxidized before the vitrification temperature is reached.

When, on the other hand, the glaze is relatively fusible it protects the underlying material over a short range at relatively low temperatures and thereafter becomes so fluid that it is either drawn deeply into the pores of the body or flows downward along its surface, in either case becoming so thin as to afford insufficient protection against oxidation.

We apply a glaze slip to the green refractory brick (or other shapes) by dipping, spraying or painting. This glaze begins to mature at approximately 900° C. and on account of its composition continues to mature by the solution of its more refractory constituents at least up to 1500° C., this range being sufficient to insure freedom from objectionable running at all temperatures to which the brick is ordinarily subject in burning or in subsequent service. We mean by "maturing" of the glaze the gradual formation of the protecting liquid coating which commences when the portion of the glaze which is most easily fluxed commences to run over the surface to be protected and continues by the gradual fluxing of the more refractory elements of the glaze. This may be continued until the liquid glaze has reached the desired composition at the highest temperature which is necessary for this purpose. The glaze thus formed protects the underlying silicon carbide from oxidation both during the time of first heating up or burning to the maximum temperature attained and also leaves the coating thus formed in position to protect the silicon carbide against oxidation on all subsequent runs to a lower temperature. If at any time the refractory is subject to temperatures higher than that of the original burn, the process of dissolving the more refractory constituents of the glaze in the fused portion thereof continues exactly in the same manner as during the original burning.

We prefer that the glaze shall begin to mature at approximately 900° C., because if fusion starts at a materially lower temperature it is very apt to interfere with the removal of carbonaceous materials, water in combination with clay bonds, etc. which must be removed from the interior of the refractory before the bond can be properly vitrified. Such materials may also be present within the refractory as a result of the use of a temporary bond, such as various gums, glucose, etc. which on being heated carbonize. In all such cases it is desirable to remove this carbonaceous material or combined water by ignition. Removal is however completed in a properly operated kiln, at temperatures not exceeding 900° C., providing there is adequate kiln circulation and the ware is set widely enough spaced and sufficient time allowed to complete the combustion of the carbonaceous material in question. Our glaze is accordingly selected to become effective at about 900° C. or a few degrees thereabove in order that opportunity may be allowed for removal of the constituents which are not desired and that protection of any oxidizable constituents comprising the main body of the refractory may be secured at temperatures where their oxidation becomes rapid.

Our glaze compositions are of a number of varieties both silicate and silicate free, and the following classifications are our best examples;

1. Fluoride compounds such as cryolite, fluorspar, etc. in combination with one or more refractory ingredients such as alumina, silica, etc. with or without other fluxes.

2. Oxyboric compounds such as boric oxide, borax, etc. in combination with one or more refractory ingredients such as alumina, silica, etc. with or without other fluxes.

3. Metallic oxides such as PbO, CuO, etc. in combination with refractory materials such as $Al_2O_3$, $SiO_2$, SiC, with or without other fluxes.

4. An alkaline silicate, such as $Na_2SiO_3$, in combination with more refractory silicates with or without other fluxes and refractory materials.

In carrying out the general process described we have used the following glaze compositions corresponding to definite examples under each of the four above mentioned general classes:

|     |     | Parts |
| --- | --- | --- |
| (1) | Cryolite | 15 |
|     | Alumina | 85 |
| (2) | Borax | 15 |
|     | Alumina | 85 |
| (3) | PbO | 2½ |
|     | CuO | 2½ |
|     | Flint | 95 |
| (4) | Sodium silicate | 5 |
|     | $BaSiO_3$ | 95 |

These compositions were made into thick slips. A small amount of gum arabic was added and the glazes applied to a number of silicon carbide brick which were then dried and burned to 1450° C. It was found that the amount of oxidation of silicon carbide was decreased in each case and by as much as 25 percent in some cases. We do not limit ourselves to these particular compositions, however, nor do we claim any particular limit in decreasing oxidation.

In the drawing we have illustrated by fusion diagrams the temperatures at which the mixtures containing different proportions of the glaze ingredients fuse.

Figures 1, 2, 3 and 4 are respectively fusion diagrams for the four glaze compositions listed above.

Figure 4:
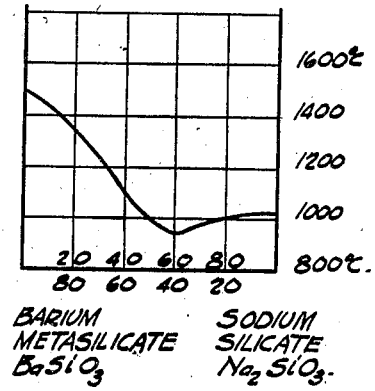

It was found that the maturing of glaze No. 1 started at about 904° C., while that of No. 4 began at 920° C. The behavior of a continuously maturing glaze of the type characterized in our invention may be followed on Figure 4 which relates to the fourth of the compositions specified above. This curve is an ordinary cone fusion curve. The composition of the glaze mixture is such that when the temperature reaches 920 C. a melt forms containing $BaSiO_3$ and sodium silicate in the proportions corresponding to the lowest point on this curve. As the temperature is increased, $BaSiO_3$, of which there is a large excess present, goes into solution in the melt and the composition of the latter at any time during the initial firing is approximately that corresponding to the mixture having a melting point equal to the temperature at the moment as indicated in Fig. 4.

It is particularly desirable that the glaze selected should not be subject to chemical change dependent upon whether the surrounding atmosphere is oxidizing or reducing, as glazes which are subject to alteration in this way are subject to serious variation in their melting point with varying furnace conditions, and are therefore not so universally useful as glazes in which such changes do not take place. Glaze mixtures Nos. 1 and 2 enumerated above are excellent examples of the type which are not affected by changes in furnace atmosphere and are therefore particularly useful in the lining of the interior of combustion chambers, coke ovens and other applications where reducing atmospheres are encountered from time to time.

In the four curves shown, the fusion temperature of the melt increases continuously as the curve approaches the left side of the diagram from a minimum value. This is the ideal condition, although satisfactory results would obviously be attained with suitably proportioned mixtures in cases where high melting intermediate compounds were found. The essential point is that the melting point increases continuously as the material which is present in excess goes into solution over a suitable temperature range extending upward from 900° C.

It is in all cases desirable that the constituents of the glaze be thoroughly pulverized and ground together before being applied, and it is further preferable, but not essential in all cases, that the glaze mixture be fritted or heat treated at approximately 900° C. for a sufficient period of time to allow all reactions or solutions which result at that temperature to establish an equilibrium with the more refractory constituents in the glaze. In this way any tendency is prevented for the more fusible materials, such as the borax shown in Fig. 2 to fuse at too low a temperature and interfere with the removal of the carbon from the temporary binder. Furthermore, such a mixture is in the ideal condition to fuse properly and afford protection to the silicon carbide immediately upon reaching the temperature at which protection of the latter is needed. The fritted material should be finely ground before application as is customary with all enamel or glaze frits used in the ceramic industry.

The method described of protecting refractories containing such oxidizable ingredients such as silicon carbide, during the process of manufacturing or during the setting of the permanent bond as in the case of a rammed lining, can be applied not only to ordinary bricks and shapes but also to such articles as graphite crucibles, ceramic bonded electrical resistors, coke brick (such as used in open hearth steel practice), etc. This process may be used in connection with any oxidizable materials (not only silicon carbide, but also other carbides, silicides, borides, the non-metals such as silicon, boron, etc., or carbon in different forms such as graphite or coke), it being well known that some forms of carbon are much more easily oxidized than others.

While we have specifically illustrated and described preferred embodiments of our invention, it is to be understood that the invention is not so limited, but may be otherwise embodied and practiced within the scope of the following claims.

We claim:

1. A glaze for silicon carbide refractories composed principally of cryolite and alumina, the latter being in excess.

2. A glaze for silicon carbide refractories, the glaze being composed principally of borax and alumina, the latter being in excess.

3. The process of mixing a flux and an aluminous refractory material soluble therein over a range of temperatures, heating the mixture to approximately 900° C. and thereafter pulverizing the mixture.

4. The process of mixing a flux and an aluminous refractory material soluble therein over a range of temperatures, heating the mixture to approximately 900° C. and thereafter applying the mixture as a glaze on a ceramic body.

5. A glaze for silicon carbide refractories which matures between the temperatures 900° C. to 1500° C., the glaze being composed principally of alumina with a small percentage of fluoride.

6. A glaze for silicon carbide refractories which matures between the temperatures 900° C. to 1500° C., the glaze being composed principally of alumina mixed with a small percentage of a boron compound.

7. A refractory article formed of silicon carbide and having a glaze thereover for protecting the same against oxidation over a temperature range of several hundred degrees, said glaze comprising two components one of which is more refractory than the other, which glaze matures continuously by solution of the more refractory component in the less refractory component over a range of temperature ranging from approximately 900° C. upwardly to at least 1200° C.

8. A glaze which matures continuously from 900° C. to 1300° C. comprising alumina and a fluxing material in which the alumina gradually dissolves as the temperature is increased between said limits.

9. In the manufacture of silicon carbide refractories, the steps which comprise forming the article from a mix containing silicon carbide grain, a carbonaceous temporary binder, and a vitrifiable ceramic permanent binder, applying to the article a glaze-forming coating composition containing a refractory and a flux in which the refractory is increasingly soluble with increasing temperatures over the range between approximately 900°C. and 1200°C., initially burning the refractory at a temperature below the initial maturing temperature of the glaze and below the temperature of rapid oxidation of silicon carbide to burn out the temporary binder, thereafter increasing the burning temperature to mature the article, the glaze composition below its initial maturing temperature allowing the hot gases to permeate the article and combine with the free carbon, the glaze through its maturing range coating the article to retard oxidation thereof until such time as the permanent binder within the article flows over the silicon carbide particles and coats them.

10. In the manufacture of a silicon carbide refractory article, the steps which comprise forming the article from a mix in the usual manner, applying to the article a two-component glaze-forming composition which matures continuously over a temperature range beginning with approximately 900° C. and extending over at least 200° C. above said initial maturing temperature, initially burning the article at a temperature below the temperature at which the glaze composition begins to mature and at a temperature at which free carbon will oxidize, the glaze composition, during this initial burning, thus being below its maturing temperature and therefore offering no resistance to the permeation of the article by oxidizing gases, thereafter increasing the temperature of the article to a point where the bond in the article will mature, the glaze composition beginning to mature as the temperature is increased to the temperature where silicon carbide oxidizes readily, and continuing to mature at the temperature at which the permanent binder for the mix is matured, whereby the glaze thus formed prevents permeation of the article by oxidizing gases in the interval at which the silicon carbide would rapidly oxidize to the temperature where the bond matures.

11. A refractory silicon carbide article having a glaze applied over the surface thereof comprised of a fluxing material which melts at a temperature approximating the temperature of rapid oxidation of silicon carbide, and a second more refractory component which is soluble in the flux in increasing amounts with increasing temperature of the flux over a range of at least 300° C., the glaze thereby maintaining a uniform viscosity over such temperature range.

12. A glaze for carbide refractory articles which matures progressively from 900° C. to 1500° C. and which comprises alumina and a fluxing material in which the alumina gradually dissolves as the temperature is increased between said limits.

13. A silicon carbide refractory article having an applied surface glaze which matures progressively from approximately 900° C. to approximately 1500° C. and which comprises alumina and a fluxing material in which the alumina gradually dissolves as the temperature is increased between said limits whereby the viscosity of the glaze varies little over the temperature range within said limits.

14. A glaze for silicon carbide refractories which matures continuously between the temperatures of 900° C. and 1500° C. and comprised principally of flint as one component and a small percentage of an oxide of one of the heavy metals as the other component.

15. A glaze for silicon carbide refractories for protecting such refractories from oxidation above the temperature at which free carbon can be burned out of the refractory and in the range of ready oxidation of silicon carbide, consisting of a compound of that class comprising a flux and a refractory which are mutually soluble in uniformly increasing amounts over a temperature range beginning at approximately 900° C. to 1300° C. approximately—so that a graph of its melting point curve rises continuously and uniformly from the lower to the higher temperature—whereby the glaze has a substantially uniform viscosity within this temperature range enabling it to spread over the refractory to exclude oxygen and sufficiently viscous to remain without substantially flowing off or soaking into the refractory in this temperature range.

16. A glaze for silicon carbide refractories consisting of a glaze compound comprising a flux and a refractory of that class wherein the refractory is soluble in the flux in gradually and continuously increasing amounts through a temperature range beginning at about 900° C. to approximately 1300° C.—so that a graph of its melting point curve rises continuously and uniformly from the lower to the higher temperature—and moreover comprising ingredients of that class which are inert with respect to the silicon carbide within this temperature range.

17. A glaze for a ceramic refractory comprising a binary mixture of mutually soluble materials of that class which have a melting point which increases continuously from a minimum of approximately 900° C. corresponding to the most fusible constituent present in the mix to at least 1300° C. as the relative proportion of said materials in the melt changes.

18. A glaze for a ceramic refractory comprising a mixture of at least two component materials, said materials being of that class in which a mixture thereof has a melting point curve which rises continuously from about 900° C. for the most fusible component in the mixture to at least 1300° C. as the relative proportion of the components in the melt changes due to increased temperature.

19. A glaze for silicon carbide refractory comprising a mixture of at least two component materials one of which is more refractory than the other and of that class wherein a mixture thereof has a melting point curve starting at approximately 900° C. for the most fusible constituent present in the mix and rises gradually and in approximately a straight line to at least 1300° C. approximately as the more refractory components present in the mixture are dissolved in the melt.

20. A glaze for silicon carbide refractory comprising a mixture of at least two component materials one of which is more refractory than the other and of that class wherein a mixture thereof has a melting point curve starting at approximately 900° C. for the most fusible constituent present in the mix and rises gradually and in approximately a straight line to at least 1300° C. approximately as the more refractory components present in the mixture are dissolved in the melt, said component materials being inert to silicon carbide at temperatures of 1300° C.

21. A glaze of that class comprising a flux and a more refractory constituent soluble in the flux and of the character in which a mixture of the refractory and flux has a melting point curve rising from a minimum of approximately 900° C. corresponding to the most fusible component capable of being formed from the constituents as actually present in the mix gradually and approximately in a straight line to at least 1300° C. as the proportion of the refractory constituent in the melt increases under the influence of heat.

22. A refractory article comprising a bonded mass of silicon carbide having a glaze thereover comprising a mixture of at least two component materials one of which is relatively more refractory than the other, and wherein a mixture thereof has a melting point curve starting at approximately 900° C. for the most fusible constituent present in the mix and rising gradually and in approximately a straight line to at least 1300° C. approximately as the other components present in the mixture dissolve in the melt.

23. A refractory having a glaze thereover composed of a binary mixture of that class whose melting point curve rises continuously in approximately a straight line from 900° C. to 1500° C. approximately as the composition of the melt changes under the influence of heat from that of the most fusible component capable of being formed from the components as actually present in the unburned glaze.

24. In the manufacture of silicon carbide refractories, the steps which comprise forming the refractory from a mix containing silicon carbide grain, a carbonaceous temporary binder and a vitrifiable ceramic permanent binder, applying to the formed article a glaze-forming coating composition, preliminarily burning the thus coated article at a temperature sufficient to oxidize the carbonaceous temporary binder but below the temperature of rapid oxidation of silicon carbide, and thereafter increasing the burning temperature above that of the rapid oxidation of silicon carbide and sufficiently to mature the ceramic permanent binder, the glaze-forming coating composition being of a continuously maturing type which does not begin to mature at the temperature of the preliminary burning, but does begin to mature at a temperature not materially above the temperature of rapid oxidation of silicon carbide and continues to mature thereafter up to a temperature not materially below the initial maturing temperature of the ceramic permanent binder, whereby hot gases are permitted to permeate the article and combine with the carbonaceous binder during the preliminary burning but the article is sealed by the glaze against the permeation of gases as the temperature is increased above that of rapid oxidation of silicon carbide up to at least the temperature at which the ceramic binder begins to mature.

25. In the manufacture of silicon carbide refractories, the steps which comprise forming a refractory from a mix containing silicon carbide grain and a vitrifiable ceramic binder containing combined water, applying to the formed article a glaze-forming coating composition, preliminarily burning the thus-coated article at a temperature sufficient to remove the combined water but below the temperature of rapid oxidation of silicon carbide, and thereafter increasing the burning temperature to a temperature above that of rapid oxidation of silicon carbide and sufficiently to mature the ceramic binder, the glaze-forming coating composition being of a continuously maturing type which does not begin to mature at the temperature of the preliminary burning and thereby permits removal of the combined water, but does begin to mature at a temperature not materially above the temperature of rapid oxidation of silicon carbide and continues to mature thereafter up to a temperature not materially below the initial maturing temperature of the ceramic binder and thereby seals the article against the permeation of gases during the final burning up to at least the temperature at which the ceramic binder begins to mature.

26. In the manufacture of silicon carbide refractories, the steps which comprise forming the refractory from a mix containing silicon carbide grain, a carbonaceous temporary binder and a vitrifiable ceramic permanent binder, applying to the formed article a glaze-forming coating composition, preliminarily burning the thus-coated article at a temperature sufficient to oxidize the carbonaceous temporary binder but below the temperature of rapid oxidation of silicon carbide, and thereafter increasing the burning temperature above that of the rapid oxidation of silicon carbide and sufficiently to mature the ceramic permanent binder, the glaze-forming coating composition being of a continuously maturing type which does not begin to mature at the temperature of the preliminary burning but does begin to mature at a temperature not materially above the temperature of rapid oxidation of silicon carbide and continues to mature thereafter over a temperature range of at least about 200° C., whereby hot gases are permitted to permeate the article and combine with the carbonaceous binder during the preliminary burning but the article is sealed by the glaze against the permeation of gases as the temperature is increased above that of rapid oxidation of silicon carbide.

27. In the manufacture of silicon carbide refractories, the steps which comprise forming the refractory from a mix containing silicon carbide grain and a vitrifiable ceramic binder containing combined water, applying to the formed article a glaze-forming coating composition, preliminarily burning the thus-coated article at a temperature sufficient to remove the combined water but below the temperature of rapid oxidation of silicon carbide, and thereafter increasing the burning temperature to a temperature above that of rapid oxidation of silicon carbide and sufficiently to mature the ceramic binder, the glaze-forming coating composition being of a continuously maturing type which does not begin to mature at the temperature of the preliminary burning and thereby permits the removal of the combined water, but does begin to mature at a temperature not materially above the temperature of rapid oxidation of silicon carbide and continues to mature thereafter over a temperature range of at least 200° C. and thereby seals the article against the permeation of gases as the temperature is increased above that of rapid oxidation of silicon carbide.

RAYMOND C. BENNER.
HENRY N. BAUMANN, Jr.